(12) United States Patent
Peddicord

(10) Patent No.: US 6,458,272 B2
(45) Date of Patent: Oct. 1, 2002

(54) MOLDED BRINE TANK

(76) Inventor: Donald B. Peddicord, 2811 Misty Cir., Durant, OK (US) 74701

( * ) Notice: Subject to any disclaimer, the term of this patent is extended or adjusted under 35 U.S.C. 154(b) by 0 days.

(21) Appl. No.: 09/962,634

(22) Filed: Sep. 24, 2001

Related U.S. Application Data

(62) Division of application No. 09/350,592, filed on Jul. 9, 1999, now Pat. No. 6,331,255.

(51) Int. Cl.$^7$ .............................................. B01D 35/00
(52) U.S. Cl. ....................................... 210/190; 210/205
(58) Field of Search ................................. 210/205, 190

(56) References Cited

U.S. PATENT DOCUMENTS

| 551,324 A | 12/1895 | Kohlmeyer |
| 945,989 A | 1/1910 | Sponenbarger |
| 1,385,903 A | 7/1921 | Cochran ..................... 248/146 |
| 1,932,117 A | 10/1933 | O'Brien et al. ............... 210/24 |
| 1,986,774 A | 1/1935 | Hopfner ..................... 210/24 |
| 2,192,451 A | 3/1940 | Moore ........................ 210/24 |
| 2,316,526 A | 4/1943 | McDonald ................... 160/104 |
| 2,657,964 A | 11/1953 | Watrous ..................... 311/105 |
| 2,669,117 A | 2/1954 | Fuhrmann .................... 72/135 |
| D181,083 S | 9/1957 | Wells ........................ D23/378 |
| 2,820,419 A | 1/1958 | Albertson |
| 2,829,934 A | 4/1958 | Schulze ...................... 311/35 |
| 3,082,587 A | 3/1963 | Brimberg .................... 55/495 |
| 3,374,891 A | 3/1968 | Buchmann ................... 210/126 |
| 3,432,038 A | 3/1969 | Heskett ....................... 210/96 |
| 3,460,566 A | 8/1969 | Heartstedt et al. ........... 137/571 |
| 3,502,442 A | 3/1970 | Campbell et al. ........... 23/272.6 |
| 3,623,978 A | 11/1971 | Boze ........................... 210/54 |
| 3,684,457 A | 8/1972 | Pinto et al. ............... 210/190 X |
| 3,732,165 A | 5/1973 | Campbell ..................... 210/190 |
| 3,760,753 A | 9/1973 | Mertens ..................... 114/0.5 T |
| 3,787,018 A | 1/1974 | Nathan ..................... 248/188.7 |
| 4,013,556 A | 3/1977 | Evans ....................... 210/291 X |
| 4,235,340 A | 11/1980 | Clack et al. ................ 206/515 |
| 4,260,487 A | 4/1981 | Gruett ........................ 210/190 |
| D264,694 S | 6/1982 | Takahashi ............... D21/108 X |
| 4,336,134 A | 6/1982 | Prior ........................... 210/127 |
| 4,337,153 A | 6/1982 | Prior ........................... 210/288 |
| 4,422,803 A | 12/1983 | Wetmore .................... 405/204 |
| 4,425,852 A | 1/1984 | Riviere ...................... 108/56.3 |
| 4,426,294 A | 1/1984 | Seal ............................. 210/662 |
| 4,448,695 A | 5/1984 | Gordon ....................... 210/694 |
| D278,110 S | 3/1985 | Boland, II ............. D21/108 X |
| 4,623,367 A | 11/1986 | Paulson ..................... 55/385 R |
| 4,718,447 A | 1/1988 | Marshall ..................... 137/268 |
| 4,753,726 A | 6/1988 | Suchanek ............... 210/291 X |
| 4,764,280 A | 8/1988 | Brown et al. ............... 210/662 |
| 4,917,794 A | 4/1990 | Fettes et al. ............... 210/96.1 |
| 4,946,600 A | 8/1990 | Shin ........................... 210/758 |
| D316,282 S | 4/1991 | Winston ..................... D21/108 |
| 5,204,048 A | 4/1993 | Rider et al. .................. 264/339 |
| 5,232,953 A | 8/1993 | Johnson ........................ 521/26 |
| 5,234,601 A | 8/1993 | Janke et al. ................. 210/662 |
| 5,283,928 A | 2/1994 | Linn et al. ............... 15/257.06 |
| 5,290,004 A | 3/1994 | Frost et al. .................. 248/528 |
| 5,310,488 A | 5/1994 | Hansen et al. .............. 210/674 |
| 5,340,485 A | 8/1994 | Bradley et al. ............. 210/767 |
| 5,411,717 A | 5/1995 | Peddicord et al. .......... 422/275 |
| D363,971 S | 11/1995 | Peddicord et al. ......... D23/207 |
| D376,837 S | 12/1996 | Peddicord et al. ......... D23/207 |
| 5,643,541 A | 7/1997 | Peddicord et al. .......... 422/275 |
| 5,788,933 A | 8/1998 | Peddicord .................... 422/275 |
| D408,905 S | 4/1999 | Hadjikyriacou ............ D23/378 |
| 6,331,255 B1 | 12/2001 | Peddicord .................... 210/670 |

FOREIGN PATENT DOCUMENTS

DE             64147           9/1892

Primary Examiner—Chester T. Barry
(74) Attorney, Agent, or Firm—Thompson & Gustavson, L.L.P.

(57) ABSTRACT

A well (12) outside of a brine tank (10) is provided which provides better accessibility to the brine refill valve (112) or other components within the well. Also, apertures (42–48) of differing elevations above the bottom of the brine tank can communicate between the brine tank and the well (12). Selected ones of the apertures can be plugged to select the quantity of water which can be removed and refilled in the brine tank.

11 Claims, 9 Drawing Sheets

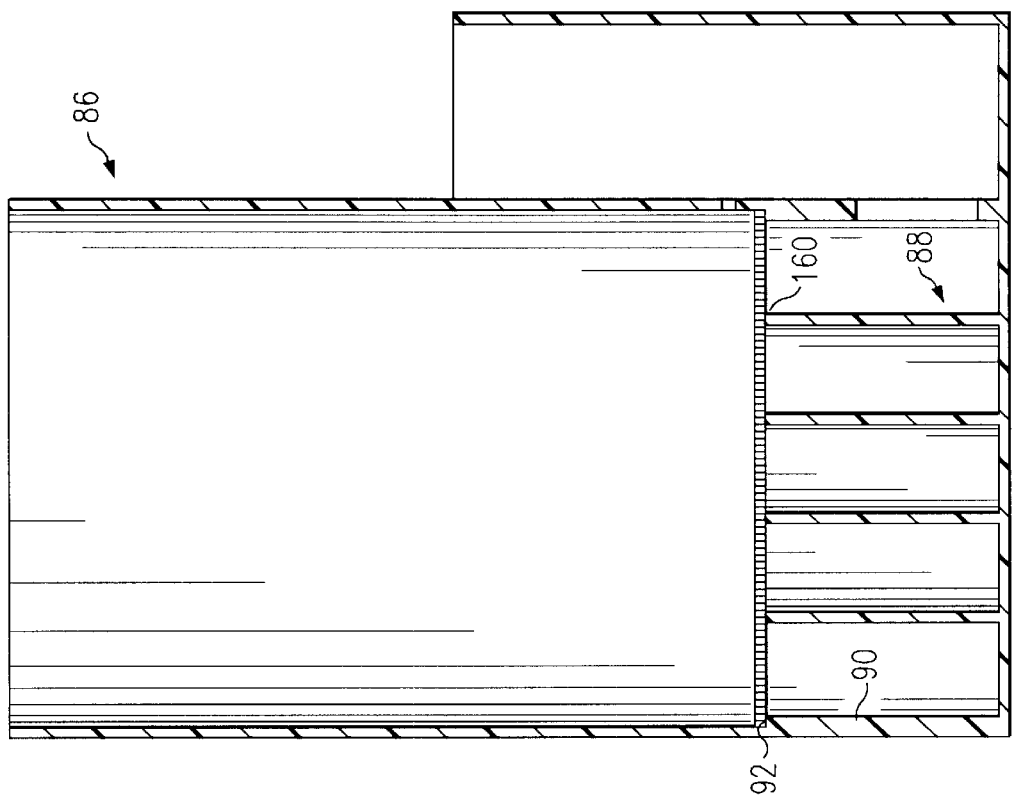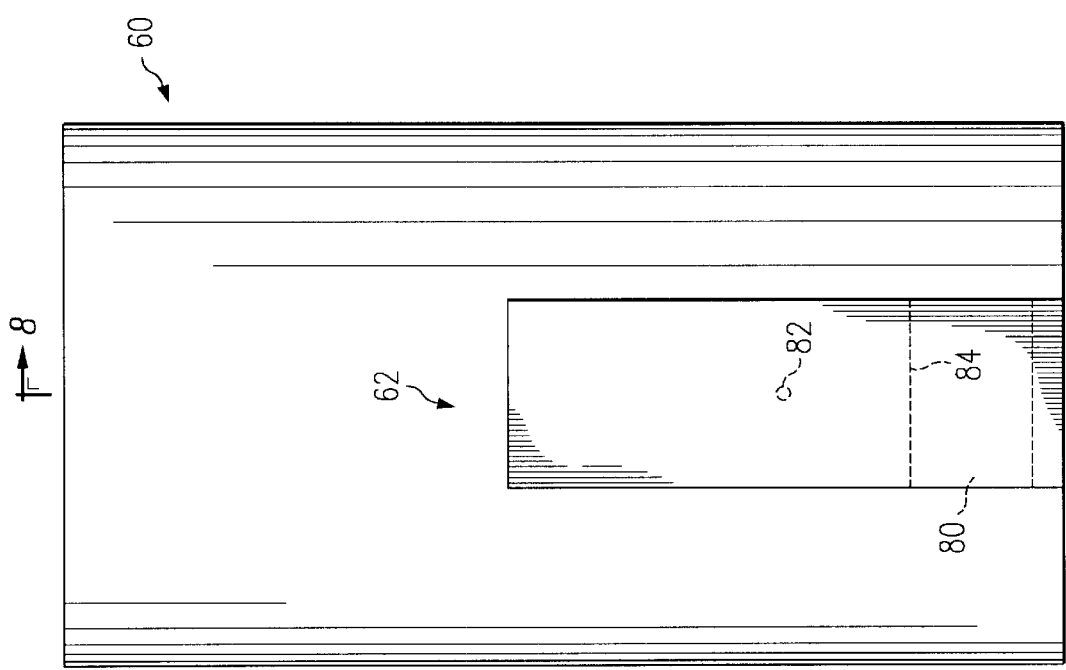

MOLDED BRINE TANK

CROSS REFERENCE TO RELATED APPLICATIONS

This is a divisional of U.S. patent application Ser. No. 09/350,592 filed Jul. 9, 1999, now U.S. Pat. No. 6,331,255.

TECHNICAL FIELD OF THE INVENTION

This invention relates to water softeners using salt, and in particular to an accessible well or control center for a brine tank.

BACKGROUND OF THE INVENTION

Water softeners find wide applications throughout society. In many applications, it is desirable to soften the water by removing the hardness materials from the water before use. This is particularly critical in boiler operations when use of hard water will create boiler scale and rapidly reduce operating efficiencies.

A common water softening process is to use water softeners designed for this purpose. Water softening tanks contain cation exchange resin capable of exchanging hardness ions, i.e., calcium and magnesium, for sodium ions which are very soluble.

When the hardness exchanging capacity of the water softening resin has exhausted, it stops producing soft water. It then becomes necessary to regenerate the resin with a saturated solution of sodium or potassium chloride. Because of costs, sodium chloride is usually the chemical of choice.

Sodium chloride brine solution is made in a separate tank built and designed for this purpose and this tank is called a brine tank. Modern water softeners are well engineered and designed to produce soft water with all regeneration actions done automatically, including the transfer of the saturated brine from the brine tank to the water softener tanks.

In order for the water softener resin to be properly rejuvenated, the saturated brine solution must be of a high quality and a measured volume must be delivered whenever needed. A properly designed and engineered brine tank will provide these needs by delivering a measured quantity of saturated salt brine containing a fixed amount of dissolved salt per gallon of water. This is accomplished by using a horizontal salt grid in a vertical tank positioned at a predetermined height in the tank. The height and diameter of the salt grid varies for each softening system, depending on many factors, but in all cases the height of the grid sets the volume of water in the brine tank. In actual practice, the brine system is set to fill the brine tank with fresh water from the bottom of the tank to approximately one inch above the salt grid and then shut off. Using this method, only one inch of water touches the vertical salt pile which may be several hundred pounds in weight, stored on top of the salt grid.

This system is called a dry salt shelf system, as opposed to a wet salt brine tank system where most or all of the salt is immersed in water. The dry salt shelf system has significant advantages over the wet salt system. The dry salt shelf method produces 100% saturated brine (specific gravity 1.2) all the time where wet salt methods do not. The dry salt shelf system affects more dry salt storage in the same size brine tank than a wet salt system. A dry salt shelf system is easier to keep clean than the wet salt system. A dry salt shelf system does not require a gravel support bed on the bottom of the brine tank. The dry salt shelf system offers lower maintenance costs to the operator, no gravel cleaning or replacement.

The dry salt shelf system uses a brine float or refill valve in the lower section of the brine tank (below the shelf). The brine refill valve is connected to a riser (a pipe) which extends upwardly to near the top of the brine tank and opens outside the brine tank. Water is both supplied to the brine tank, and removed from the brine tank, through this riser when the refill valve is open. For example, when the brine tank requires filling, water is provided through the riser to the valve to fill the brine tank to a level slightly above the salt grid. A float, operably connected with the brine refill valve, will cause the valve to close when the predetermined quantity of water has been supplied to the tank. After saturation, water is removed through the same riser, past the valve, by drawing a suction in the riser. The valve, float and riser are normally positioned within a well (usually a vertical tube) sometimes called a control center within the brine tank to help isolate the elements from the salt within the tank.

While this system has worked well, servicing of the valve, float and riser within the well is a complicated procedure. A typical brine tank may be 60 inches tall and 50 inches in diameter. Service personnel will be required to reach from the top of the brine tank to near the bottom of the tank to service the brine refill valve and float. The salt grid, where the float will be commonly located, may only be 12 inches off the bottom of the tank. The valve itself may rest on the bottom of the tank. If the brine tank is completely full of salt, salt may in fact cover over the cap on the top of the well near the top of the tank, requiring service personnel to dig down through the salt to reach the cap and remove it to access the well. A need exists for an improved design providing more ready accessibility to these components for servicing and repair.

SUMMARY OF THE INVENTION

In accordance with one aspect of the present invention, an apparatus is provided for use with a brine tank having a salt platform therein supporting a quantity of salt, the salt platform is at a predetermined height within the brine tank. The apparatus includes a well positioned outside of the brine tank and in fluid communication with the interior of the brine tank. The well can be integrally formed with the brine tank, secured to the brine tank or free standing and fluidically connected to the brine tank by conduits or the like.

In accordance with another aspect of the present invention, the well can contain a brine refill valve and a riser. A float can be positioned within the well for operating the brine refill valve. The well need only be so high as to accommodate the fluid within the well, allowing it to be far shorter than the brine tank itself, permitting easier access.

In accordance with another aspect of the present invention, a grid without a well opening is contemplated.

In accordance with another aspect of the present invention, a method of servicing a brine tank having a salt platform therein supporting a quantity of salt is provided. The salt platform is at a predetermined height within the brine tank. The method includes the step of accessing a well positioned outside of the brine tank and in fluid communication with the interior of the brine tank.

BRIEF DESCRIPTION OF THE DRAWINGS

For a more complete understanding of the present invention and the advantages thereof, reference is now made to the following description taken in conjunction with the accompanying drawings, in which:

FIG. 7 is a front view of the brine tank of FIG. 5 illustrating the well;

FIG. 8 is a vertical cross-sectional view of a brine tank forming a third embodiment of the present invention which is rotationally molded;

DETAILED DESCRIPTION OF THE INVENTION

Figure 1:
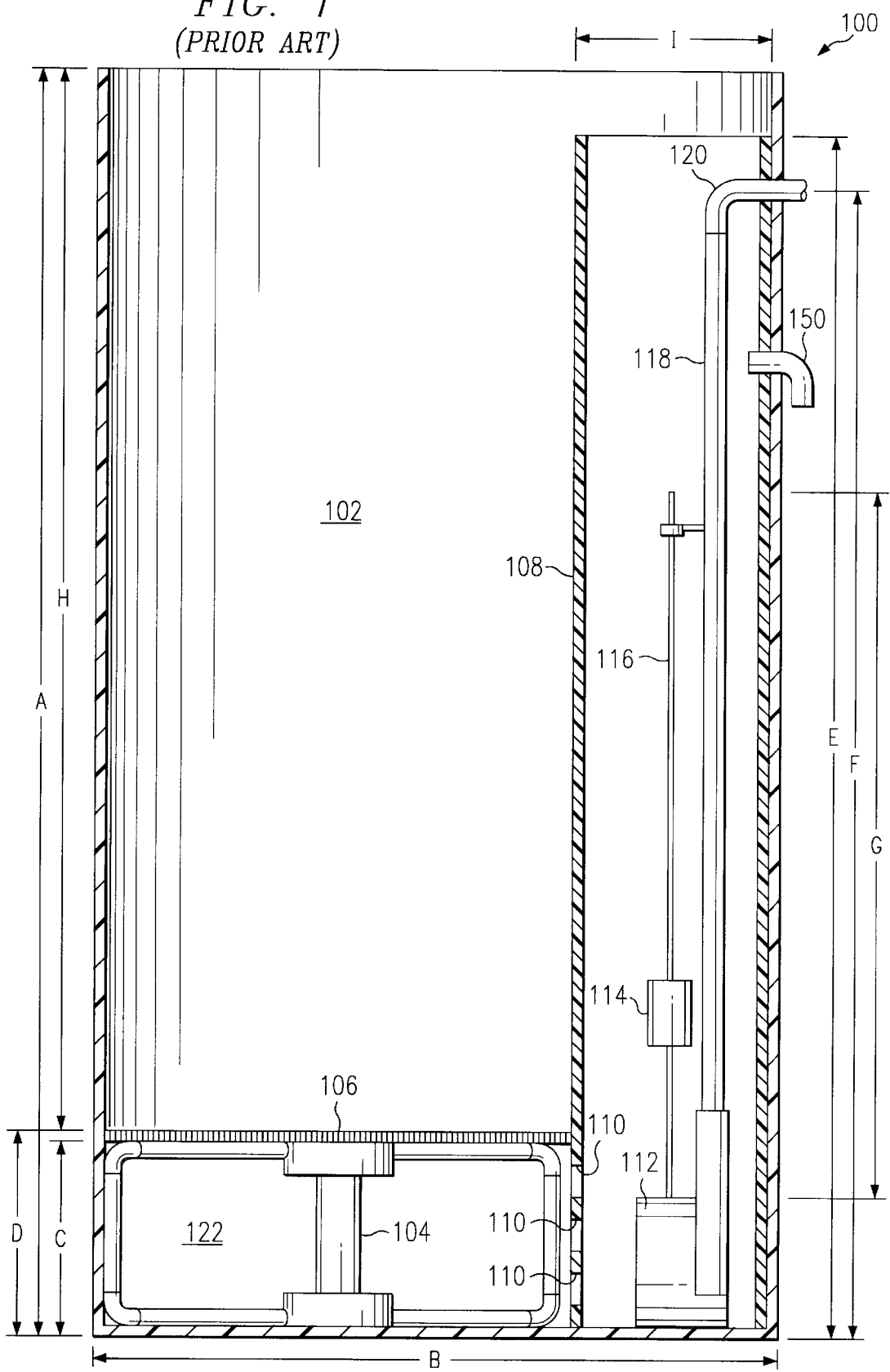
FIG. 1 is a cross-sectional view of a brine tank with a well common in the prior art.

With reference now to the accompanying drawings, wherein like or corresponding parts are designated by the same reference numeral, FIG. 1 illustrates a prior art brine tank 100 which illustrates the state of the art at the present time. Brine tank 100 is a cylindrical tank having height A and a diameter B. Alternatively, tank 100 can be square. Positioned within the tank interior 102 is a salt platform 104 supporting a salt grid 106. Salt will normally be contained in the portion of interior 102 designated by the letter H. The salt will be supported on the salt grid 106.

A well 108, typically formed of a hollow pipe or tube of diameter I and height E will be mounted on an interior surface of the tank 100, within the interior 102. A series of apertures 110 near the lower end of the well 108 allow fluid flow between the interior of the well and the remainder of the interior 102.

Within the well 108 is mounted a brine refill valve 112 which is operated by a float 114 through a float rod 116. A riser 118 extends from the valve 112 to near the top of the well 108 where it is provided with an elbow 120 and extends through the wall of the tank 100 exterior of the tank. The rod 116 extends a distance G above the bottom of the tank 100 while the riser extends to a height F above the bottom of the tank.

In one design of the type illustrated, the tank height A is 60 inches. The tank diameter B is 50 inches. A water holding space 122 below the salt grid, having height C, has a height of 12 inches. The distance D from the bottom of the tank to the top of the salt grid 106, D, is 12-¼ inches. The height E of the well 108 is 56 inches. The height F to the top of the riser 118 is 52 inches. The rod length G is 40 inches, with the float about 16 inches from the bottom and 36 inches from the top of the well. The height of salt storage H is about 60? inches while the diameter I of the well 104 is about 6–¼ inches. The tank can be filled with 3434 pounds of salt if filled even with a well cap closing off the top of the well 108 or about 3700 pounds if filled over the well cap to the top of the tank.

As previously noted, operation of the tank 100 is facilitated by well known components outside the tank. When water is required in the tank 100, these exterior components cause water to flow to elbow 120, to the riser 118, through the valve 112 and into the holding space 122 through the apertures 110. The float 114 and float rod 116 rise as the water level rises in the well 108 until the desired level is reached, upon which the float rod 116 closes the brine refill valve 112 to prevent additional water from entering the tank 100. The tank 100 usually has an overflow connection 150 which is routed to a drain or sewer in the event the valve 112 fails and the tank 100 overfills. An overflow connection is used in tank 100 regardless if the float is used as the cut-off valve where it is under pressure at all times, or as a safety float when used in conjunction with timed refill. When water is to be removed, a suction is drawn in the riser 118, causing the valve 112 to open against the resistance of the float 114 and draw water from the holding space 122. It should be noted that, while the water level is meant to be about one inch above the salt bridge, the salt displacement causes the water to rise to a higher level within the well 108 where the float is positioned, for example, five or so inches above the water level outside of the well 108. While a design of this type functions well, it is very difficult to service the components within the well 108. As can be appreciated, access to the tank 100 will be from the top of the tank, requiring an operator to reach down the entire depth of the well to access the valve, float and float rod. If this cannot be done, then it is necessary to remove the entire valve.

Figure 2:
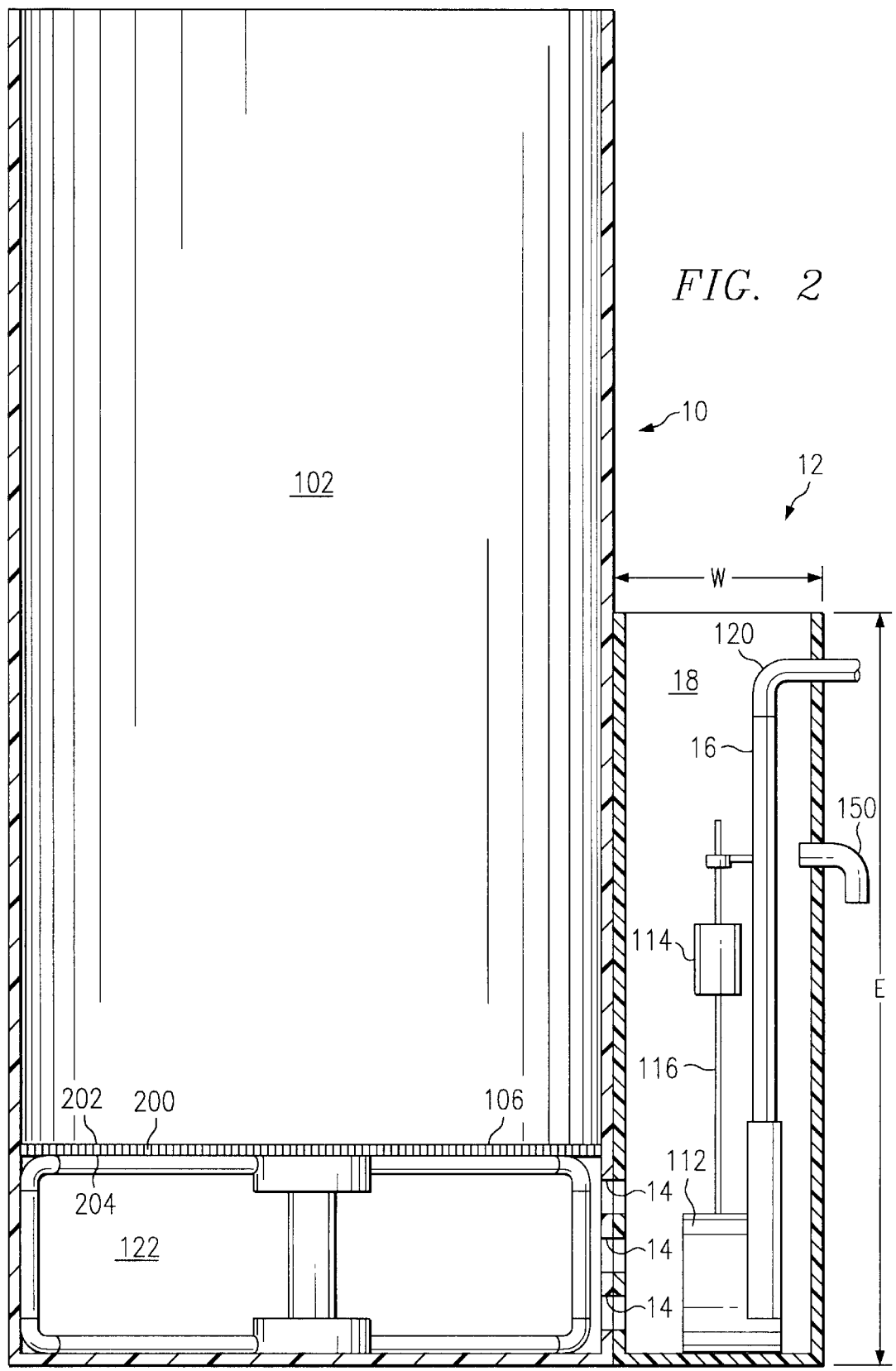
FIG. 2 is a cross-sectional view of a first embodiment of the present invention illustrating a well positioned outside of a brine tank.

With reference now to FIG. 2, a first embodiment of the present invention will be described. A brine tank 10 is provided with a well 12 which is exterior the brine tank 10. The well 12 can be formed integrally with the brine tank 10, attached to the brine tank 10 or can be a separate free standing element from the brine tank 10. In any case, the well 12 20 is in fluid communication with the brine tank 10 through one or more apertures 14 formed through the wall of the brine tank 10 and opening into the interior 18 of well 12. Located within the well 12 is a brine refill valve 112, float 114 and float rod 116. A riser 16, of far shorter length than the riser 118 of tank 100, extends from the brine refill valve 112 to near the top of the well 12 and ends in an elbow 120 communicating exterior the well. As can be appreciated, because the well 12 is outside of the brine tank 10, the height of the well is not determined by the height of the tank, but instead needs only be as high as needed to accommodate the fluid level within the well. For example, the well for use with a tank 100 as previously described may only be of height E of 24 inches. In the well 12 illustrated in FIG. 2, the well has a rectangular configuration with a width W of about six inches and a length, extending perpendicular the view of FIG. 2, of about 18 inches.

The operation of the well 12 will be very similar to that of the well in tank 100.

When water is to be added to the brine tank 10, water is supplied to the elbow 120 on riser 16, which flows through the valve 112 and through the apertures 14 into the holding space 122 of the brine tank 10. The valve 112 closes when the water level within the well 12 causes the float 114 to lift the float rod 116 sufficiently to close the valve or when the refill program timer has timed out. Similarly, when water is to be drawn from the brine tank 10, the components exterior the tank supply a suction to the riser 16, causing water to be sucked from the holding space 122, through the aperture 14, valve 112 and the riser 16.

By moving the well outside of the brine tank, there is no longer a necessity for forming a passage in the salt grid 106 to accommodate the well. Also, the volume of the well within the brine tank has been eliminated, allowing more salt to be placed within the tank. For example, the capacity of a tank can be increased about 15 pounds by elimination of a typically sized well within the tank.

In the design illustrated in FIG. 2, the well 12 is preferably molded or welded to the exterior surface of the brine tank 10 in a fluid tight manner, with aperture 14 formed directly through the wall of the brine tank 10, opening into the interior 18 of the well. Alternatively, the well 12 can be a freestanding well, with a pipe or pipes connecting the brine tank 10 and the well 12 to provide for fluid communication between the interior 18 of the well 12 and the holding space 122 of the brine tank 10.

In one device constructed in accordance with the teachings of the present invention, the distance from the bottom of the well 12 to the top of the brine valve rod is about 22 inches. The float is located approximately seven and one-half inches from the top of the well for easy adjustment. The well 12 width was six inches, the height 24 inches and the length 18 inches.

As can be readily understood, the accessibility of the well 12 located outside of the brine tank is much enhanced over the accessibility of the well within the prior art design as illustrated in tank 100. The operator need no longer access the well from within the brine tank and the height of the well is reduced significantly, providing safer accessibility for the operator.

Other advantages include isolation of the well from dirt and debris often mixed with the salt. While prior art wells isolate the interior of the well somewhat, it was possible for dirt and debris to migrate into the well through the apertures communicating between the well interior and the holding space 122. The use of a well outside the brine tank provides less possibility of such contamination. Further, because the operation of the valve is effected by any tilt in the brine tank 100, the brine tank 100 had to be leveled. With the well 12 being exterior the brine tank 10, the principal leveling operation will need only to be that of the well itself.

Figure 3:
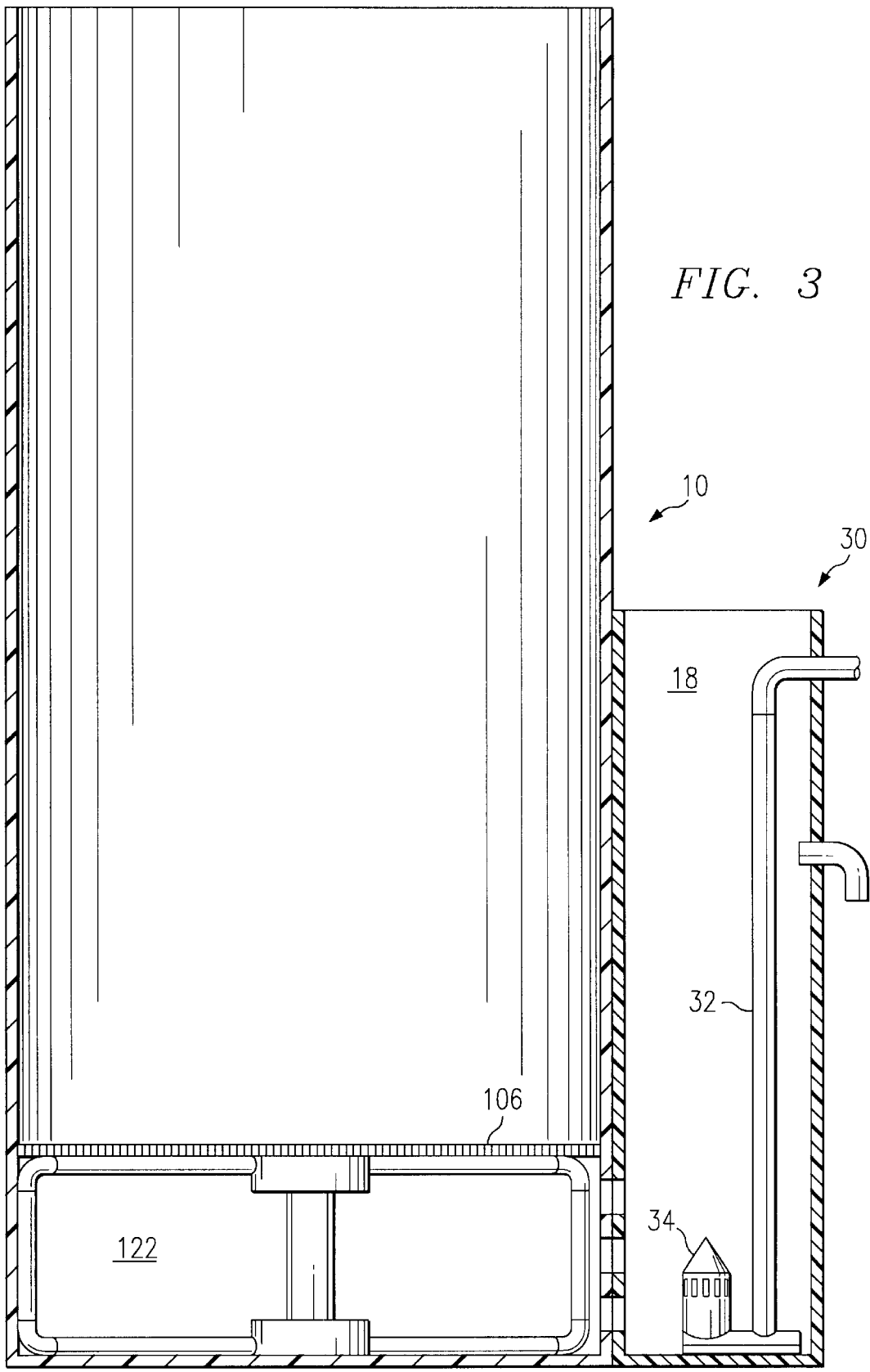
FIG. 3 is a cross-sectional view of a first modification of the apparatus of FIG. 2 illustrating a well containing a brine refill valve.

With reference now to FIG. 3, a first modification of the present invention will be illustrated. A modified well 30 is mounted to a brine tent 10 and contains a riser 32 of the type used with timed refill systems. In a timed refill system, a brine refill valve 112 is used and contains an air check 34 with screen for removal and refill purposes. In a timed system, a timer exterior the brine tank controls the flow of water to the riser 32 for entry into the holding space 122 of the brine tank 10. The timer times off when an elapsed time has passed which causes the holding space 122 to be filled. Similarly, water is removed from the brine tank by drawing a suction in the riser 32 to drain the water from the holding space 122, into the interior 18 of the well 30 and up the riser 32.

Figure 4A:
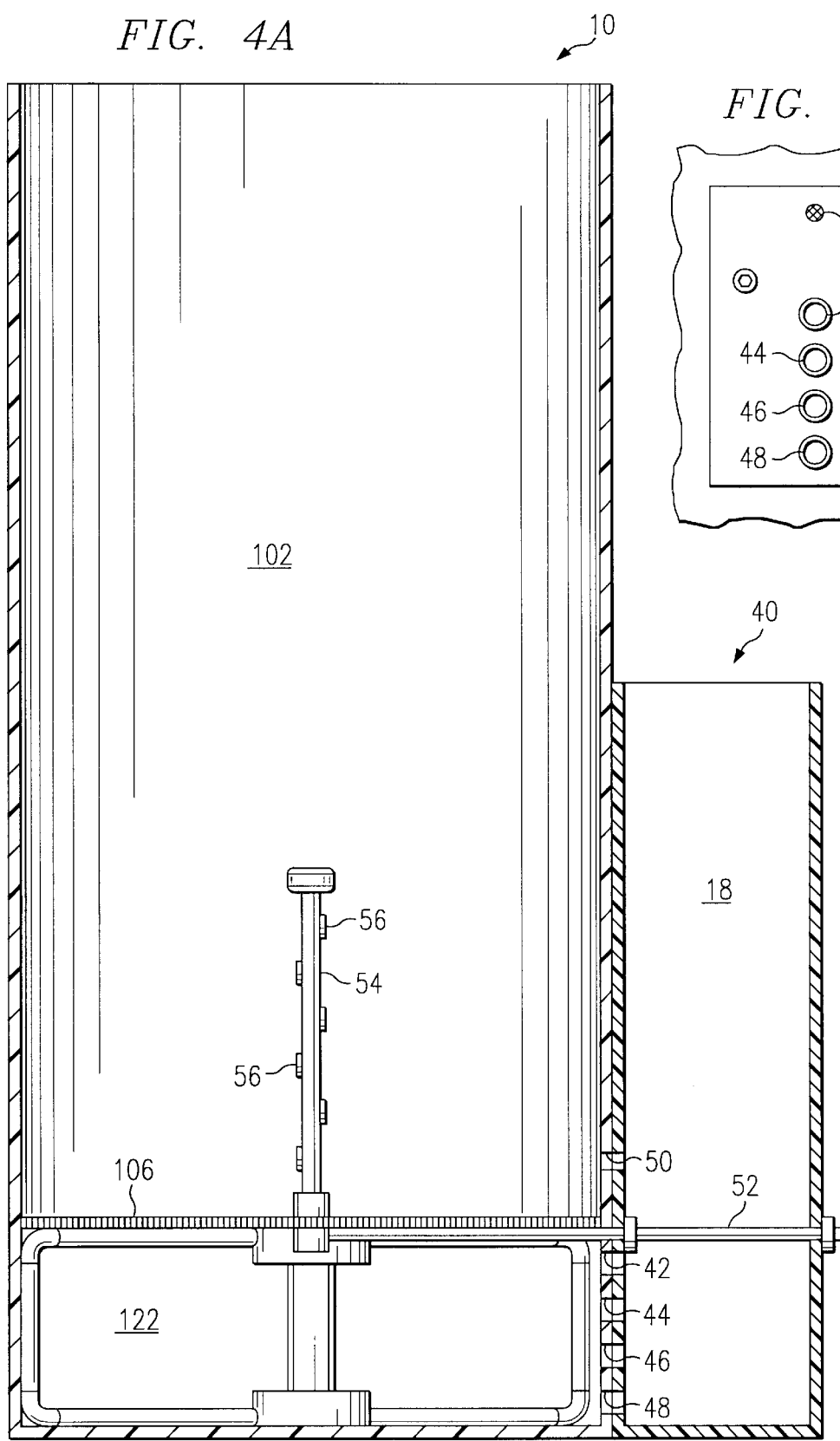
FIG. 4 is a cross-sectional view of a second modification of the present invention illustrating the use of a plurality of passages between the well and brine tank at different elevations.
Figure 4B:
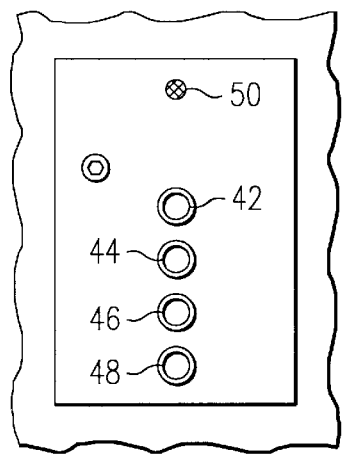

With reference to FIG. 4, a second modification of the present invention will be illustrated. A well 40 is either mounted on the brine tank 10 or free standing relative thereto. There are a series of apertures 42, 44, 46 and 48 opening through the wall of the brine tank 10 into the interior 18 of the well 40 at different heights above the bottom of the brine tank 10. The apertures 42–48 preferably have a threaded interior or, are in the form of pipe nipples, with a threaded exterior end, which permits a plug to be threaded therein or thereon to block passage of water from the holding space 122 within the brine tank 10 through a particular aperture into the interior 18 of the well 40. As noted previously, for a given softening operation, the quantity of water within the holding space 122 within a brine tank is usually determined by the position of the salt grid, realizing that the water level is only normally about an inch or so above the top of the salt grid. By use of apertures 42–48, a single size brine tank 10, using a single height salt grid 106, can be utilized for a number of different applications by simple plugging the necessary apertures 42–48. For example, if a relatively low quantity of water is utilized, plugs will be placed in apertures 44, 46 and 48, those nearest the bottom of the tank, providing communication between the holding space 122 of the salt tank and the interior 18 of the well 40 only through the highest aperture 42. Thus, the quantity of water that can be removed for the softening operation through the riser within the well 40 will be only the quantity of water down to the level at the bottom of the aperture 42. Similarly, if a slightly increased volume of water is needed, the aperture 44 can be opened, and only the water above the bottom of the aperture 44 will be drawn off in the softening operation. Similarly, the apertures 46 or 48 can be opened for removal of even larger quantities of water from the brine tank. The maximum quantity is provided by opening the aperture 48, which effectively allows complete draining of the holding space 122 within the brine tank 10. Thus, for a single salt platform 108 and salt grid 106 height, the versatility of varying quantities of water for delivery can be achieved by use of the apertures 42–48. For example, aperture 42 may be set for a six pound per cubic foot quantity. Aperture 44 may be set for an eight pound per cubic foot quantity. Aperture 46 may be set for a ten pound cubic foot quantity, while aperture 48 may be set for a 15 pound per cubic foot quantity. While only four apertures are shown, clearly as many apertures as are desired can be provided. Preferably, a screen equalizer hole 50 is provided above the apertures 42–48 for equalizing between the interior of the brine tank 10 and the interior 18 of the well 40. Preferably, the screened equalizing hole 50 is located about one inch above the salt grid 106 and is approximately one inch in diameter.

The embodiment of FIG. 4 also illustrates a fluid line 52 which extends from outside the well 40, through the well and into the interior of the brine tank 10. A vertical spray bar 54 extends upwardly from the inner end of the line 52 near the center of the brine tank into the mass of salt within the brine tank. In the past, it has been found that occasionally salt will clump together in a large mass, reducing the efficiency of its dissolving within the water in the brine tank. By providing water under pressure to the line 52, water will be sprayed from the spray nozzles 56 of bar 54 into the mass of salt surrounding the spray bar, which will help break up any such clumping.

The advantages of the present system allows the outside control chamber within the well to be installed with plenty of space for installing valves quickly and easily. Servicing is faster as the distance from the top of the control chamber of the well to the bottom is short, and all adjustments can be made using either one or two hands without removing the valve. The design allows the brine valve to stay cleaner as it is outside the fall area from the grid to the bottom of the salt tank where dirt and insolubles accumulate. The well can be either manually attached to the outside of the brine tank by welding, or free standing with connections through pipe nipples, or can be integrally molded with the brine tank at the time of manufacture. The brine tank wall which opens into the interior of the well can be formed or molded with appropriate numbers and sizes of openings necessary to pass water into the control chamber of the well to provide adequate flow in and out of the well as required. To retroactively install such a well on a preexisting tank, these openings can be manually drilled or cut.

As noted, the openings through the brine tank wall will be specifically placed in such a manner that they can regulate the amount of water into the control chamber of the well. By using this method, a single grid placed at a pre-determined height in the brine tank can be used to deliver different quantities of water.

One easy application of the advantages of the present invention to common brine tanks is to form apertures as needed through the wall of the brine tank and fit tank bulkhead fittings, known as tank buttresses. These are pipe nipples which are sealed to the tank and extend outside the tank, typically being threaded both interiorly and exteriorly at the exposed end of the nipple, where the well can be mounted. The user has a choice from greater than 15 pounds of salt to less than 5 pounds of salt, or any increment in between per cubic foot of water softening resin. This is desirable if the water softener function is changed from a high quality water requiring 15 pounds of salt per cubic foot of resin to a lower quality water using a lesser number of pounds of salt per cubic foot of resin or vice versa. For example, a 450,000 grain water softener regenerated to 100 percent capacity requires 15 pounds of salt at saturated brine solution per cubic feet of resin or 225 pounds of salt, regenerated to 90 percent capacity requires 10 pounds salt in saturated brine solution per cubic foot of resin or 150 pounds of salt, regenerated to 80 percent capacity requires 8 pounds salt in saturated brine solution or 120 pounds of salt, regenerated to 66 ⅔ percent capacity requires six pounds of salt in saturated brine solution per cubic foot of resin or 90 pounds of salt.

Presently, most large tanks having diameters greater than 72 inches currently do not use brine valves because of the inaccessibility to the valves. By use of the teachings of the present invention brine valves can be mounted in wells outside the brine tank no matter what the diameter of the brine tank.

As noted previously, the past design with a well located within the brine tank has increased the cost of the salt grid. In larger grids, a well hole must be manually cut into the grid. In injected molded plastic grids, the design becomes more expensive as the opening size must be designed and then molded for the well. Sometimes the grid is molded where the hole is to be cut out manually for the installation of the well, creating extra work for the installer.

In addition, an advantage is realized in the ability to make the salt grid 106 well-less. That is, because no well is necessary in the brine tank, the salt grid need have no large passage therethrough for accommodating the well 108. The salt grid 106 can be made of any suitable material, including polyethylene and polypropylene. The salt grid 106 need only have a plurality of small apertures 200 formed therethrough (for example, ¼ inch in diameter) connecting the upper surface 202 and the lower surface 204 for passage of water between the upper and lower surfaces.

Figure 5:
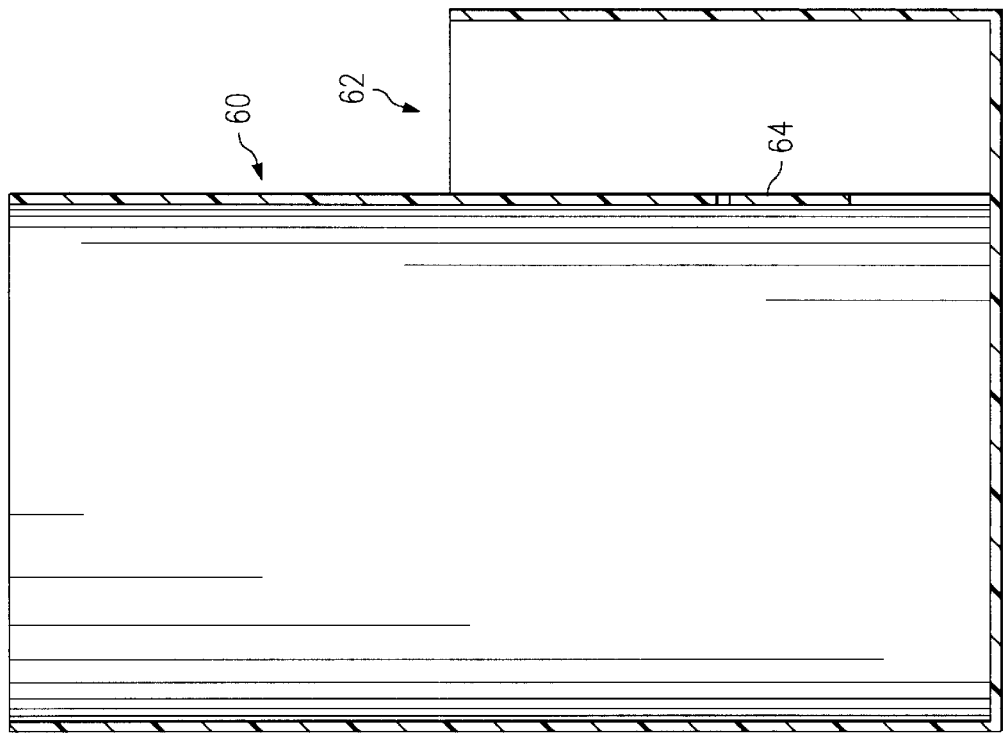
FIG. 5 is a vertical cross-sectional view of a brine tank forming a second embodiment of the present invention which is molded in one piece.

With reference now to FIG. 5, a brine tank 60 is illustrated which forms a second embodiment of the present invention. The brine tank 60 is a one-piece molded unit with an integral well 62. The brine tank 60 can, for example, be molded of polyethylene or fiberglass. The thickness of the walls of the brine tank 60 and well 62 are preferably about ³⁄₁₆" thick.

The vertical inside tank wall 64 extends downwardly into the well 62 or control center only a sufficient distance for a grid plate to fit against the wall 64. If desired, in integrally formed ledge can be molded in the brine tank 60 to provide a support for a grid plate.

Figure 6:
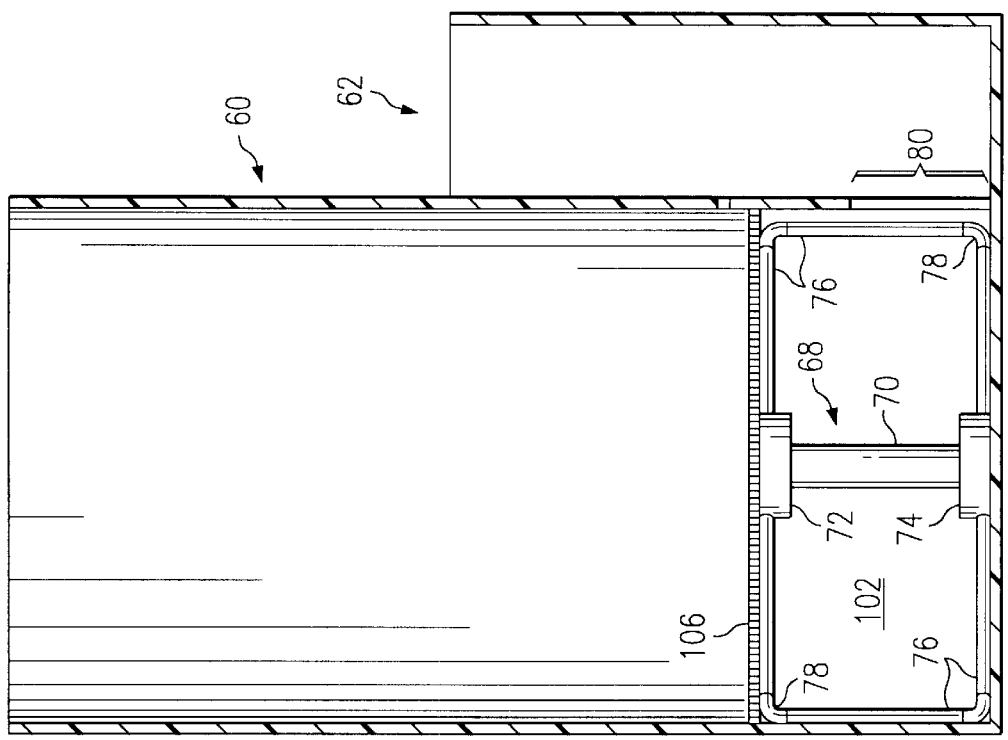
FIG. 6 is a vertical cross-sectional view of the brine tank of FIG. 5 incorporating a grid support.

FIG. 6 illustrates the brine tank 60 with a grid support 68 mounted therein. Grid support 68 is of the type disclosed in Applicant's co-pending U.S. patent application Ser. No. 09/115,306, filed Jul. 14, 1998, the disclosure of which is hereby incorporated by reference in its entirety herein. The salt platform includes a vertical center pipe 70 with a top cap 72 and bottom cap 74. A series of PVC pipe section 76, and elbows 78, form a radially extending frame to support the salt grid 106.

FIG. 7 is a front view of the brine tank 60 which illustrates the extent of the tank wall 64 extending into the well 62. From the lower edge 84 of the tank wall 64 downward to the bottom of the brine tank 60, an opening 80 connects the well 62 to the interior 102 of the brine tank 60. A screened equalizer opening 82 is formed through the tank wall 64 above the lower edge 84 of the tank wall 64 to provide for equalization above the water level in the brine tank 60.

Figure 9:
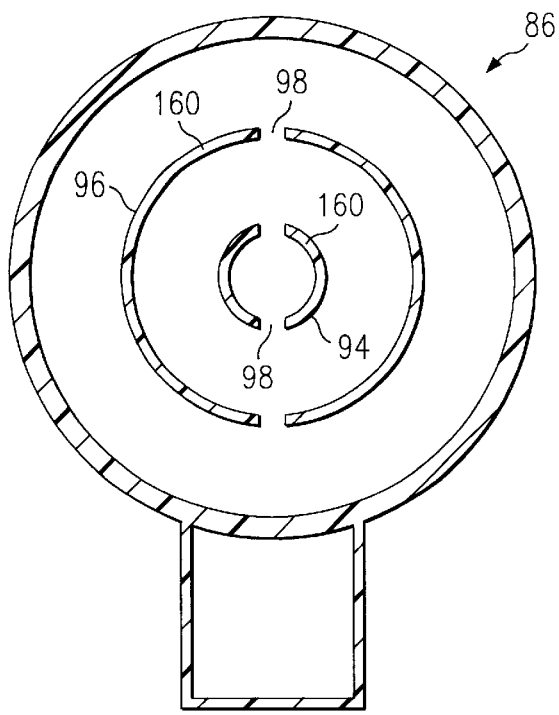
FIG. 9 is a partial vertical cross-section view of the molded tank of FIG. 8.

FIG. 8 illustrates a brine tank 86 which is similar to brine tank 60. However, brine tank 86 is formed by rotationaly molding the brine tank. Also, inside supports 88 are integrally formed with the brine tank 86 during rotational molding. Further, brine tank 86 is formed with a reinforced inside wall height 90, forming an integral radial ledge 92 to support the salt grid, along with the inside supports 88. As can best be seen in FIG. 9, the inside supports are formed by radial inner support 94 and radial outer support 96. The supports do not form full circles and are separated on opposite sides by gaps 98 to permit free water flow. The top edges 160 of the supports 94 and 96 are at the same height as the ledge 92 to provide supports for the salt grid.

Figure 10:
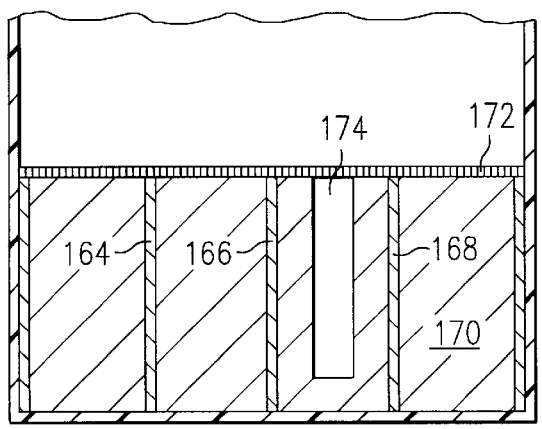
FIG. 10 is a cross-sectional plan view of a first modification of the brine tank of FIG. 8.
Figure 11:
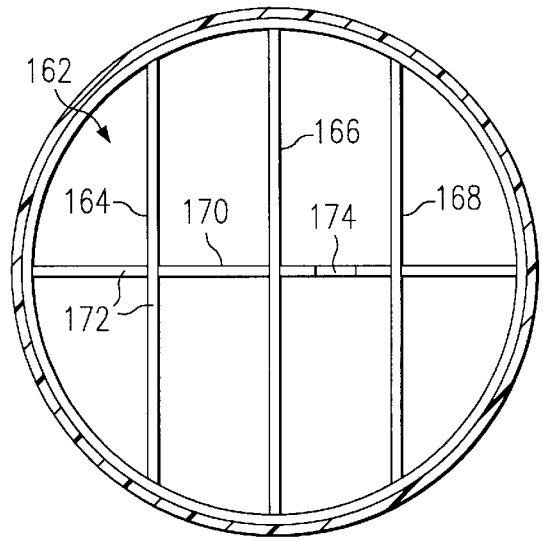
FIG. 11 is a cross-sectional plan view of the brine tank of FIG. 10.

FIGS. 10 and 11 illustrate a modification to the brine tank 86. In the design of FIGS. 10 and 11, the inside supports 162 are formed in a square configuration having parallel vertical sections 164, 166 and 168 and a perpendicular vertical section 170. Again the top edges 172 are coplanar with the ledge 92 to support a salt grid. Gaps 174, as seen in FIG. 10, are utilized to permit free water flow.

Figure 13:
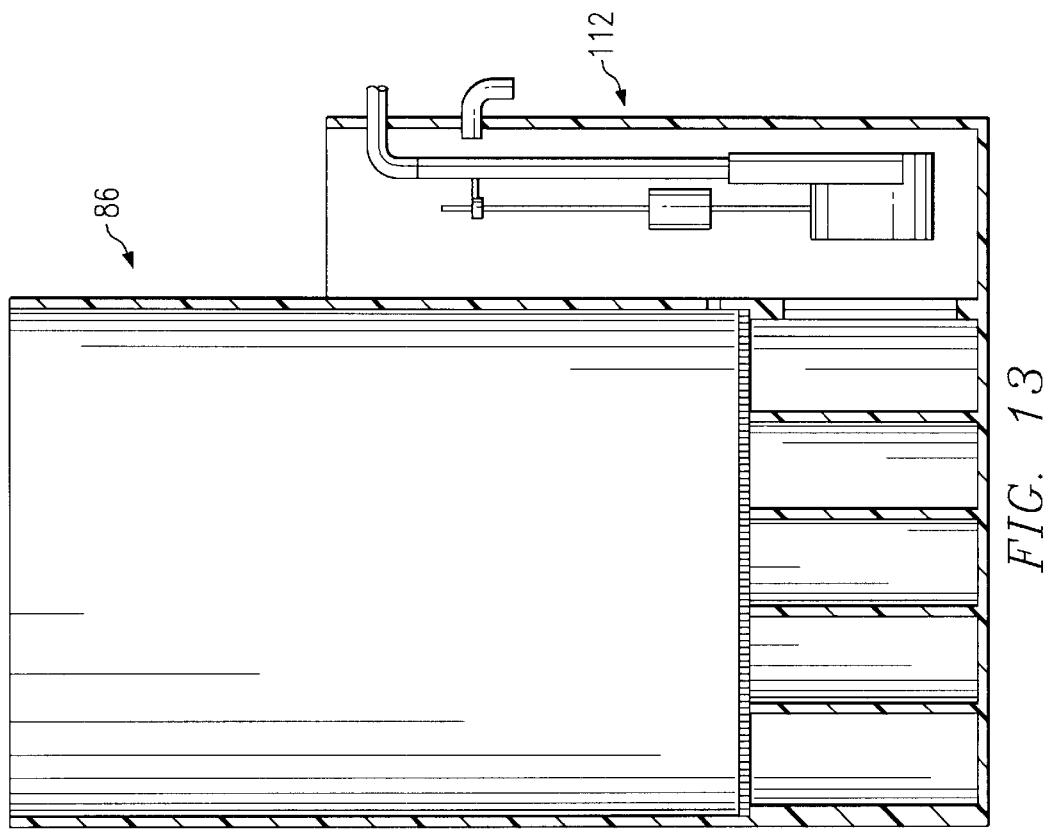
FIG. 13 is a vertical cross-sectional view of the brine tank of FIG. 8 with the brine pull and refill valve set at 10 pounds salt per cubic foot resin.
Figure 12:
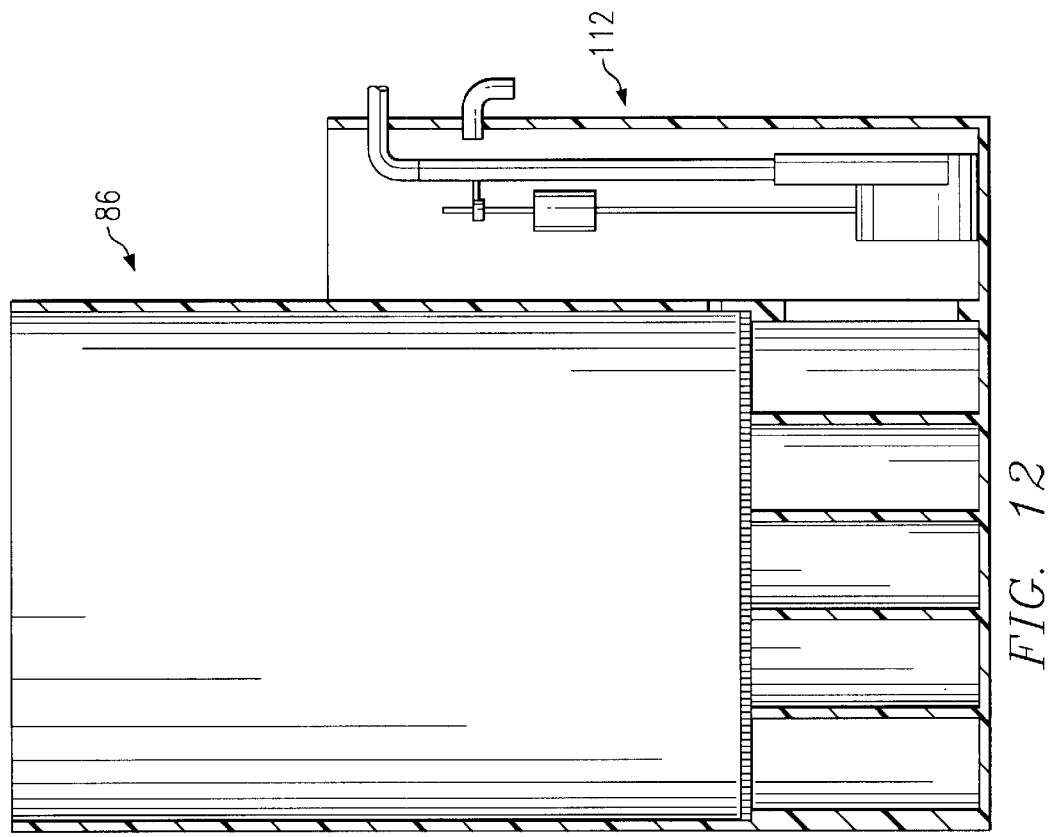
FIG. 12 is a vertical cross-sectional view of the brine tank of FIG. 8 with a brine pull and refill valve set a 15 pounds salt per cubic foot of resin.
Figure 14:
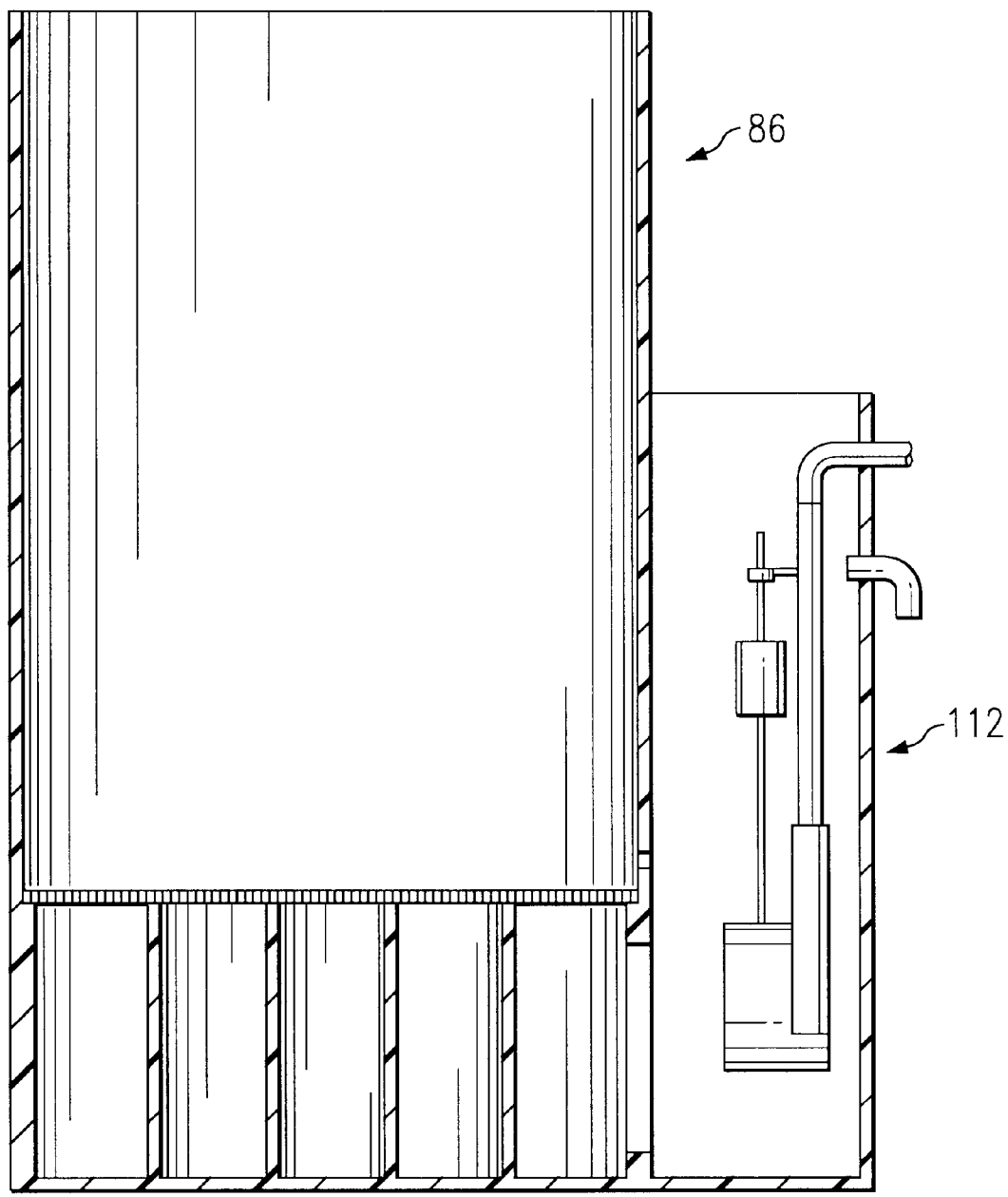
FIG. 14 is a vertical cross-section of the brine tank of FIG. 8 illustrating the brine pull and refill valve set at 6 pounds salt per cubic foot resin.

FIG. 12 illustrates a brine tank 86 having a brine pull and refill valve 112 set at about 15 pounds of salt per cubic foot of resin. FIG. 13 illustrates the brine tank 86 with the brine pull and refill valve 112 set at 10 pounds of salt per cubic foot of resin. FIG. 14 illustrates brine tank 86 with the brine pull and refill valve 112 set at 6 pounds of salt per cubic foot of resin.

Although only one embodiment of the invention has been illustrated in the accompanying drawings and described in the foregoing detailed description, it will be understood that the invention is not limited to the embodiment disclosed, but is capable of numerous rearrangements, modifications and substitutions in parts and elements without departing from the spirit and scope of the invention.

I claim:

1. A molded brine tank having a volume therein for supporting salt on a salt grid, the grid supported on a plurality of vertically extending salt platform members in the brine tank.

2. The molded brine tank of claim 1 wherein the salt platform includes a vertical center pipe with a top cap and a bottom cap, a plurality of pipe sections and elbows, the pipe sections and elbows connecting with the center pipe to support the salt grid.

3. The molded brine tank of claim 1 wherein the vertically extending salt platform members are integrally molded with the molded brine tank.

4. The molded brine tank of claim 3 wherein the vertically extending salt platform members are arcuate and have top edges lying in a common plane to support a salt grid.

5. The molded brine tank of claim 4 wherein the vertically extending salt platform members have gaps therebetween below the top edges to define a holding space.

6. The molded brine tank of claim 3 wherein the vertically extending salt platform members are formed by a plurality of parallel vertical sections and at least one perpendicular vertical section, the sections having top edges lying in a common plane to support a salt grid.

7. The molded brine tank of claim 6 wherein the vertical sections have gaps formed therethrough to define a holding space.

8. The molded brine tank of claim 1 having an integrally formed ledge to support a salt grid.

9. The molded brine tank of claim 1 being molded of polyethylene.

10. The molded brine tank of claim 1 being molded of fiberglass.

11. The molded brine tank of claim 1 being rotationally molded.

* * * * *